United States Patent [19]

Eichenseer

[11] Patent Number: 4,867,337
[45] Date of Patent: Sep. 19, 1989

[54] GAS CAP ASSEMBLY WITH RETAINER MEANS

[75] Inventor: Robert Eichenseer, Orangeburg, S.C.

[73] Assignee: Roper Corporation, Ill.

[21] Appl. No.: 121,603

[22] Filed: Nov. 17, 1987

[51] Int. Cl.⁴ .............................................. B65D 55/16
[52] U.S. Cl. .................................................. 220/375
[58] Field of Search ............. 220/373, 375, 367, 86 R, 220/374, DIG. 33

[56] References Cited

U.S. PATENT DOCUMENTS

| | | | |
|---|---|---|---|
| 1,408,082 | 2/1922 | Dowler | 220/375 |
| 1,450,077 | 3/1923 | Haas | 220/375 |
| 1,518,467 | 12/1924 | VanPelt | 220/375 |
| 4,113,138 | 9/1978 | Fields et al. | 220/375 |
| 4,467,937 | 8/1984 | Shaw | 220/DIG. 33 |

FOREIGN PATENT DOCUMENTS 238052  5/1964  Fed. Rep. of Germany .

Primary Examiner—George T. Hall

[57] ABSTRACT

A cap assembly for closing the inlet of a fuel tank comprising a closure cap for releasable mounting on the tank inlet, an anchor chain secured at one end to the underside of the closure cap and carrying a spring retaining member at the lower end thereof for positioning in the tank. The closure cap has a two part inter-engaging construction comprising a lower cap portion and an upper cap portion. The lower cap portion is formed with generally T-shaped anchor chain retaining slots which are adapted for receiving and positively retaining the upper end of the anchor chain in assembled position without auxiliary fastening means. The upper cap portion is formed with a pair of depending tangs which are adapted for releasable engagement with the anchor chain retaining slots in the lower cap member for preventing disassembly and removal of the retained anchor chain.

16 Claims, 1 Drawing Sheet

GAS CAP ASSEMBLY WITH RETAINER MEANS

DESCRIPTION OF THE INVENTION

The present invention relates generally to tank cap assemblies used to close the inlet of a tank, such as a fuel tank, and more particularly, to such a tank cap assembly which has means for retaining the fuel cap in close association with the tank when the cap is removed.

Tank cap assemblies with anchoring means for maintaining the cap in close proximity to the tank upon removal have long been known. Such devices typically comprise a tank cap with a chain which is attached at one end to the cap and which carries a spring like retainer at its other end that is positioned in the tank and sized such as to prevent its withdrawal from the tank inlet when the cap is removed. The chain often is attached to the cap by a nut and bolt assembly, or other relatively complicated fastening means, which can be cumbersome and time consuming to assemble and which add to the manufacturing cost of the device. Other devices have utilized spring biased arrangements for securing the anchoring chain to the cap, which can become dislodged if the cap is pulled away from the tank with too much force. In such event, the user has the cumbersome and often messy task of attempting to reassemble the anchor chain to the cap.

It is an object of the present invention to provide a tank cap assembly with anchoring means which is relatively simple and inexpensive in construction and easy to assemble.

Another object is to provide a tank cap assembly as characterized above in which the anchor chain is positively and reliably secured to the cap without nut and bolt or like auxiliary fastening elements.

A further object is to provide a tank cap assembly of the above kind which has only a relatively few easily producible and assembleable parts.

Other objects and advantages of the invention will become apparent upon reading the following detailed description and upon reference to the drawings, in which.

Figure 1:
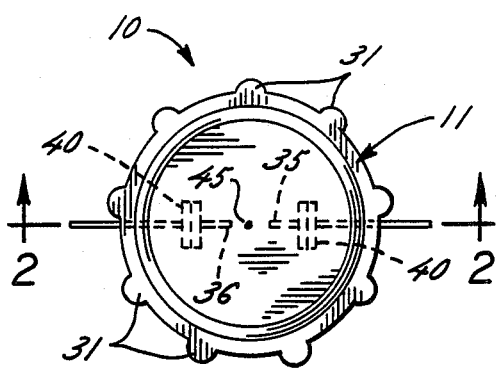
FIG. 1 is a top view of an illustrative tank cap assembly embodying the present invention.
Figure 3:
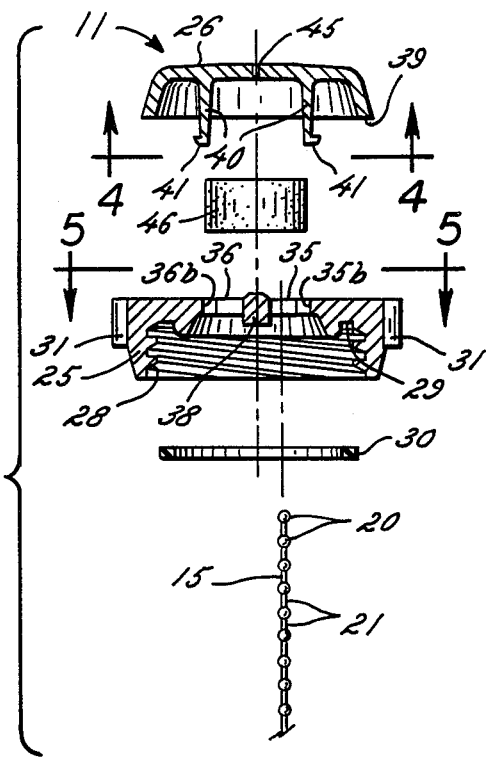
FIG. 3 is an exploded view of the illustrated tank cap assembly.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to the drawings, there is shown an illustrated tank cap assembly 10 having a cap 11 mounted on the upstanding inlet 12 of a typical fuel tank 14. The tank cap assembly 10 includes an anchor chain 15 which extends in depending fashion from the cap 11 into the tank 14 and which carries a spring retaining member 16 at the lower end thereof. The retaining member 16, which may be made of any suitable flexible wire, in this case forms a centrally disposed loop 17 with legs 18 extending in opposing directions such that the width of the retaining member 16 normally is greater than the diameter of the tank inlet 12. As is known in the art, the legs 18 of the retaining member 16 may be forced together to permit insertion into the tank. The outermost ends of the legs 18, in this instance, are formed with slight upwardly turned tips 19 which are adapted for engaging the underside of the tank 14 upon removal of the cap 11.

The anchor chain 15 preferably is in the form of a beaded plastic line, which in the illustrated embodiment, includes a plurality of equally spaced enlarged diameter beads 20 separated by elongated relatively smaller diameter linear or link sections 21. The lowermost end of the chain 15 is formed with an enlarged apertured clasp 22 that supports the central loop 17 of the spring retaining member 16.

In accordance with the invention, the cap has a two part interlocking construction with a lower portion thereof being formed with slotted apertures for receiving and positively retaining the upper end of the anchor chain without auxiliary fastening means. To this end, in the illustrated embodiment, the cap 11 comprises a lower cap portion 25 and a separate releasably engageable upper cap portion 26, both of which preferably are mold formed from a durable plastic material. The lower cap portion 25 has an annular configuration formed with internal threads 28 for threadedly engaging the externally threaded tank inlet 12. The underside of the lower cap portion 25 is formed with an annular groove 29 within which it is lodged an annular sealing ring 30. Upon threaded advancement of the lower cap portion 25 onto the tank inlet 12, the annular sealing ring 30 is sealingly compressed between the lower cap portion and the outer exposed end of the tank inlet. The outer perimeter of the lower cap portion 25 is formed with a plurality of circumferentially spaced gripping ribs 31 to facilitate turning of the cap during removal and replacement.

Figure 2:
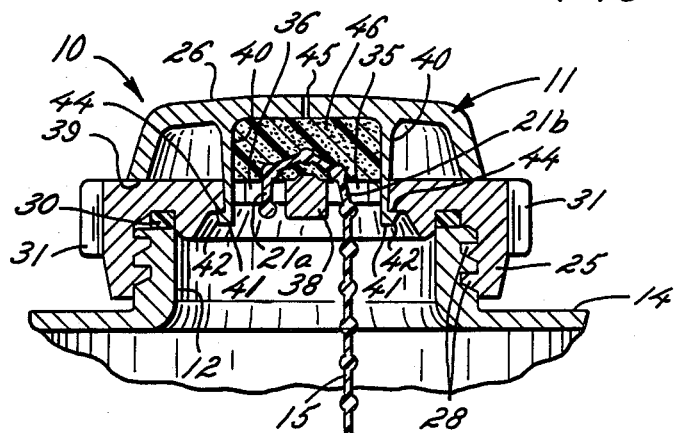
FIG. 2 is an enlarged vertical section of the illustrated tank cap assembly taken in the plane of line 2—2 in FIG. 1.
Figure 4:
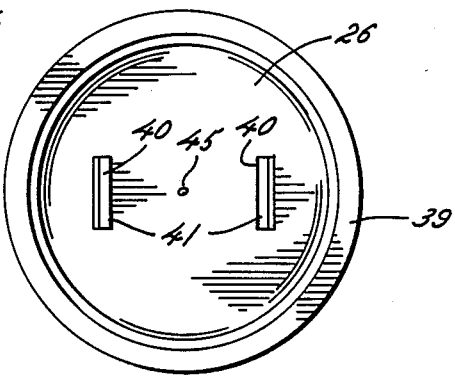
FIG. 4 is an enlarged bottom view of an upper cap portion of the illustrated assembly taken in the plane of line 4—4 in FIG. 3.
Figure 5:
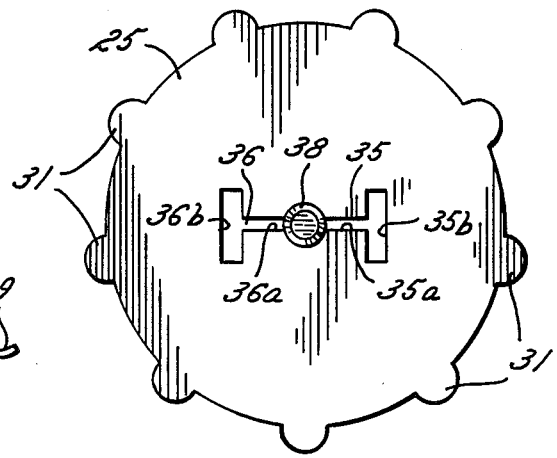
FIG. 5 is an enlarged top view of a lower cap portion of the illustrated assembly taken in the plane of line 5—5 in FIG. 3.

For positively securing the upper end of the anchor chain 15 to the cap 11, the lower cap portion 25 is formed with a pair of generally T-shaped slots 35, 36 located in diametrically opposed relation to each other on opposite sides of a central area 38 of the lower cap portion 25. The T-shaped slots 35, 36 each include a relatively narrow radially extending aperture portion 35a, 36a, of a width corresponding substantially to the diameter of the linear or link portion 21 of the chain 15 and an enlarged aperture portion 35b, 36b at the outer end thereof which is dimensioned to permit easy passage of the relatively larger diameter beads 20 of the chain 15. During assembly, the upper end of the chain 15 is positionable upwardly through the large aperture portions 35a of one of the T-shaped slots 35, wrapped over the central area 38 of the lower cap member 25, and then be directed through the enlarged aperture portion 36b of the other T-shaped slot 36. The first link portion of the chain 15, designated 21a in FIG. 2, is positionable into the narrow aperture portion 36a of the slot 36 and another link portion, designated 21b in FIG. 2, is positionable into the narrow aperture portion 35a. The relatively larger diameter beads positively and securely retain the chain in mounted position in the T-shaped slots 35, 36 without the necessity for auxiliary nuts, bolts or like fastening elements.

In keeping with the invention, the upper cap portion includes means which both releasably secure the upper cap portion to the lower cap portion and which prevent removal of the anchoring chain from its retaining slots. The upper cap portion 26 in this instance has a generally downwardly directed cup shaped form with an outermost perimeter 39 adapted for positioning onto the upper side of the lower cap portion 25. For releasably inter-engaging the lower and upper cap portions 25, 26, the upper cap portion 26 is formed with a pair of integrally formed downwardly directed tangs 40 which extend below the level of outer perimeter 39 of the upper cap portion 25 for positioning in the enlarged transversely directed aperture portions 35b, 36b of the T-shaped slots 35, 36 in the lower cap portion. The tangs 40 in this instance are formed with enlarged heads 41 at their lowermost ends having tapered sides 42 that cam the tangs in inwardly directed fashion, as they are being forced into the apertures 35b, 36b. It will be understood that the resiliency of the plastic material of the upper cap portion will be sufficient to permit such limited inward biasing of the tangs during assembly. Upon passage of the enlarged heads 42 of the tangs 41 through the apertures 35b, 36b in the lower cap portion, they will spring outwardly, with upper ledge portions 44 (FIG. 2) of the heads 41 positively engaging the underside of the lower cap member so as to prevent removal. While the tangs 40 do not physically engage the anchor chain 15, it will be seen that since the tangs occupy the enlarged aperture portions 35b, 36b of the T-shaped slots 35, 36 the beads 20 of the chain cannot be moved into or positioned through the enlarged apertures 35b, 36b, thereby preventing accidental disengagement and removal of the chain. In the event it is desired to remove or replace the anchor chain 15, this may be easily accomplished by first simply forcing together the enlarged heads 41 of the tangs 40 from the underside of the lower cap portion 25 and removing the upper cap portion.

The upper cap portion 26 is formed with a vent 45, and a porous, flexible pad 46, preferably made from urethane foam, is positioned in interposed relation between the upper and lower cap portions 25, 26 so as to cover the vent 45 and the anchor chain receiving slots 35, 36, thereby preventing accidental splashage of fuel or other liquid from within the tank through the venting aperture. Since the resilient foam pad 46 also encompasses the portion of the anchor chain 15 which is trained around the top of the lower cap portion 25, it tends to maintain the chain in its mounted position.

From the foregoing, it can be seen that the tank cap assembly of the present invention is adapted for relatively economical manufacture and easy assembly, comprising four basic components, namely the lower and upper cap portions 25, 26, the anchor chain 15, and the retaining member 16. The anchor chain 15 is positively and reliably secured to the cap without cumbersome manipulation or handling of auxiliary fastening elements or the like and is easily removable for replacement.

We claim as our invention:

1. A tank cap assembly for closing the inlet of a tank comprising, a closure cap for releasable mounting on said tank inlet, said cap having a two part construction comprising a lower portion and an upper portion, an anchor chain, a retaining member mounted at the lower end of said chain for positioning in said tank, said retaining member normally having a width larger than the size of said tank inlet for resisting withdrawal therefrom, means for releasably connecting an upper end of said anchor chain to said cap, said connecting means comprising aperture means formed in lower cap portion such that an upper end of said chain may be trained through said aperture means for releasable positive engagement therethrough without auxiliary fastening means, and said upper cap portion being releasably engageable with said lower cap portion for covering said anchor chain aperture means and for preventing removal of said anchor chain from said aperture means.

2. The tank cap assembly of claim 1 in which said aperture means comprise a pair of anchor chain retaining slots.

3. A tank cap assembly for closing the inlet of a tank comprising, a closure cap for releasable mounting on said tank inlet, an anchor chain, a retaining member mounted at the lower end of said chain for positioning in said tank, said retaining member normally having a width larger than the size of said tank inlet for resisting withdrawal therefrom, means for releasably connecting an upper end of said anchor chain to said cap, said connecting means comprising aperture means formed in said cap such that an upper end of said chain may be trained through said aperture means for releasable positive engagement therewith without auxiliary fastening means, and said aperture means comprising a pair of anchor chain retaining slots each having a relatively small sized aperture portion for receiving and positively retaining said anchor chain and a relatively large size aperture portion communicating with said small sized aperture portion for permitting free passage of said chain through said slots during assembly and disassembly of said chain in said cap.

4. The tank cap assembly of claim 3 in which said chain has a plurality of relatively large sized longitudinally spaced beads connected together by smaller diameter linear sections, and said linear sections being positionably mounted in said small aperture portions with said beads positively retaining said chain in such mounted position.

5. The tank cap assembly of claim 4 in which said slots each gave a generally T-shaped form.

6. The tank cap assembly of claim 3 in which said small sized aperture portions extend radially outwardly from a central area of said cap and said large size aperture portion each extend transversely to the radially extending small sized portion.

7. The tank cap assembly of claim 3 in which said cap has a two part inter-engaging construction, said anchor chain slots being formed in one part and said other part being mountable on the top of said one part for covering said anchor chain apertures and the portion of the anchor chain retained therein.

8. The tank cap assembly of claim 3 in which said cap has a two part construction comprising a lower portion and an upper portion, said lower cap portion being formed with means for releasably engaging said tank inlet, said anchor chain apertures being formed in said lower portion, and said upper cap portion being mountable on the top of said lower cap portion for covering said anchor chain retaining apertures and the portion of said anchor chain mounted therein.

9. The tank cap assembly of claim 8 including means releasably connecting said upper cap portion to said lower cap portion.

10. The tank cap assembly of claim 9 in which said releasable cap portion connecting means comprises at least one tang that extends in depending fashion from the underside of said upper cap portion for releasable engagement with said lower cap portion.

11. The tank cap assembly of claim 9 in which said releasable cap portion connecting means comprises a pair of tangs extending in depending fashion from said upper cap portion, said tangs each being releasably engageable with a respective one of said large size aperture portions of said anchor chain retaining slots.

12. The tank cap assembly of claim 11 in which said tangs upon engagement in said large sized aperture portions prevent removal of said anchor chain from said small sized aperture portions of said anchor chain retaining slots.

13. The tank cap assembly of claim 12 in which said tangs are adapted for limited relative movement upon mounting in said large size aperture portions and are biased into engagement with said lower cap portion upon positioning in said large size aperture portions.

14. The tank cap assembly of claim 13 in which said tangs each are formed with abutment means for engaging the underside of said lower cap portion upon positioning into said large size aperture portions for retaining said upper cap portion in mounted position.

15. The tank cap assembly of claim 8 in which said upper cap portion is formed with a vent opening, and a resilient foam member is interposed between said upper and lower cap portions covering said vent opening.

16. The tank cap assembly of claim 15 in which said resilient foam member covers said anchor chain retaining slots in said lower cap portion and is compressed against the portion of said anchor chain retained in said apertures.

* * * * *